(12) United States Patent
Julian (10) Patent No.: US 12,376,595 B1
(45) Date of Patent: Aug. 5, 2025

(54) DEVICE FOR HANGING AND TRANSPORTING MEAT

(71) Applicant: Rian Robert Wade Julian, San Martin, CA (US)

(72) Inventor: Rian Robert Wade Julian, San Martin, CA (US)

( * ) Notice: Subject to any disclaimer, the term of this patent is extended or adjusted under 35 U.S.C. 154(b) by 0 days.

(21) Appl. No.: 18/733,831

(22) Filed: Jun. 4, 2024

(51) Int. Cl.
*A22C 15/00* (2006.01)

(52) U.S. Cl.
CPC .................. *A22C 15/005* (2013.01)

(58) Field of Classification Search
CPC ... A22C 15/001; A22C 15/002; A22C 15/003; A22C 15/005
USPC .......................... 452/135, 187–192
See application file for complete search history.

(56) References Cited

U.S. PATENT DOCUMENTS

| | | |
|---|---|---|
| 2,270,857 A | 1/1942 | De Moss |
| 2,631,520 A | 3/1953 | Geerling |
| 3,447,263 A | 6/1969 | Johnson |
| 4,185,424 A | 1/1980 | Streit |
| 4,246,854 A | 1/1981 | Lempa, Jr. |
| 4,317,257 A | 3/1982 | Engel |
| 4,738,060 A | 4/1988 | Marthaler et al. |
| 4,745,706 A | 5/1988 | Muza et al. |
| 4,828,307 A | 5/1989 | Sokol et al. |
| 4,860,404 A | 8/1989 | Flachs |
| 4,870,781 A | 10/1989 | Jones |
| 4,901,397 A | 2/1990 | Pursell et al. |
| 4,926,785 A | 5/1990 | Lamson |
| 5,042,517 A | 8/1991 | Stewart |
| 5,087,019 A * | 2/1992 | Peabody .................. A22B 5/06 254/133 R |
| 5,122,090 A | 6/1992 | Van de Nieuwelaar et al. |
| 5,145,224 A * | 9/1992 | Welk .................. A22B 5/06 D22/199 |
| 5,217,194 A | 6/1993 | Brownell |
| 5,279,073 A | 1/1994 | Czebieniak |
| 5,288,265 A * | 2/1994 | Beason .................. A22B 5/06 452/187 |
| 5,360,368 A | 11/1994 | Hajek |
| 5,396,743 A | 3/1995 | Bellette |
| 5,462,479 A | 10/1995 | Hajek |
| 5,562,534 A | 10/1996 | McGough |
| 5,564,232 A | 10/1996 | Callaway |
| 5,605,010 A | 2/1997 | Furlong et al. |
| 5,707,281 A | 1/1998 | Hicks |
| 5,713,787 A | 2/1998 | Shoenmakers et al. |
| 5,881,495 A | 3/1999 | Clark |
| 5,901,497 A | 5/1999 | Bulvin |
| 6,076,300 A | 6/2000 | Cronin |

(Continued)

FOREIGN PATENT DOCUMENTS

CA 2317694 C 2/2002

*Primary Examiner* — Richard T Price, Jr.
(74) *Attorney, Agent, or Firm* — AdamsIP, LLC; Stephen Thompson; James Hunter Adams (57) ABSTRACT

A device and method for hanging and transporting game meat is provided. The device includes at least one hollow tube and at least one attachment that can be secured to an upper end of the tube. The attachment has hooks that can be inserted into the meat for hanging the meat from the device. The meat can be de-boned, and the tube can be used to replace the bone to provide support for the de-boned meat and to transfer heat away from the meat to prevent spoilage.

19 Claims, 8 Drawing Sheets

(56) References Cited

U.S. PATENT DOCUMENTS

| | | |
|---|---|---|
| 6,186,882 B1 | 2/2001 | Adams et al. |
| 6,210,263 B1 | 4/2001 | Meyer |
| 6,244,949 B1 | 6/2001 | Moody |
| 6,349,514 B1 | 2/2002 | Adams |
| 6,484,440 B2 | 11/2002 | Brown |
| 6,672,322 B1 | 1/2004 | Littlefield |
| 6,729,666 B2 | 5/2004 | Mullis |
| 6,843,020 B2 | 1/2005 | Lutz |
| 6,895,613 B1 | 5/2005 | Clouston |
| 7,059,956 B1 | 6/2006 | Summerlin |
| 7,217,182 B1 | 5/2007 | McConnell et al. |
| 7,225,585 B2 | 6/2007 | Zayeratabat |
| 7,252,583 B1 | 8/2007 | Jones |
| 7,264,544 B2 | 9/2007 | Tokarski et al. |
| 7,367,877 B1 | 5/2008 | Luster |
| 7,485,032 B1 | 2/2009 | Hogue |
| 7,597,614 B2 | 10/2009 | Forbes et al. |
| 8,062,107 B1 | 11/2011 | Sauer |
| 9,314,013 B2 | 4/2016 | Mancuso, Jr. |
| 9,339,043 B1 | 5/2016 | Paulson |
| 9,485,996 B2 | 11/2016 | Ellis et al. |
| 9,504,261 B1 | 11/2016 | Collins |
| 10,398,093 B2 | 9/2019 | Bahler et al. |
| 11,019,828 B1 | 6/2021 | Summerfield |
| 11,085,199 B2 | 8/2021 | Writesman |
| 11,284,629 B2 | 3/2022 | Florell |
| 2004/0225319 A1 | 11/2004 | Konyn et al. |
| 2005/0098087 A1 | 5/2005 | Carroll, Jr. |
| 2010/0173574 A1 | 7/2010 | Gass et al. |
| 2013/0211466 A1 | 8/2013 | Ballard et al. |
| 2014/0276452 A1 | 9/2014 | Cowan et al. |
| 2014/0283445 A1 | 9/2014 | Chabot |
| 2016/0201712 A1 | 7/2016 | Boyd |
| 2017/0290324 A1 | 10/2017 | Rocha et al. |
| 2022/0162875 A1 | 5/2022 | Bright et al. |
| 2022/0220688 A1 | 7/2022 | Weinberg et al. |
| 2023/0371530 A1 | 11/2023 | Julian |

\* cited by examiner

DEVICE FOR HANGING AND TRANSPORTING MEAT

FIELD OF THE INVENTION

The present invention relates generally to a device for hanging and transporting meat. The device may be used to support a de-boned piece of meat for hanging and/or transporting the meat.

BACKGROUND

Hunters face several challenges when attempting to take down large game for its meat. One of these challenges is returning the meat of the animal out of the wilderness without the meat spoiling. Large game animals are often hunted in remote areas, which can make it very difficult to refrigerate the meat after taking down an animal. After successfully taking down an animal, the meat quickly begins to spoil due to the animal's internal heat. This spoilage is often caused by the internal temperature of the animal being retained within the animal's bones and preventing the meat from cooling, thereby allowing bacteria to begin to multiply throughout the meat. Barriers to heat transfer reduce the rate of heat transfer from the interior of the meat to the external environment and thus slows the process of cooling the meat to prevent spoilage.

Traditionally, hunters field dressed meat to prevent blood from entering the meat and to allow the internal temperature to cool. Field dressing involves taking the quarters of a large animal, such as an elk, moose, or deer, and making a slice along the length of the quarter. This slice exposes the bone to the air to allow the heat retained within the bone of the meat to dissipate without having to transfer through flesh surrounding the bone. While this can help to speed the rate of heat loss, the cut generally needs to be held open by some means in order to maintain an increased rate of heat loss from the meat.

Although some hunters prefer not to de-bone meat such as quarters for reasons relating to meat quality, some hunters choose to de-bone meat after downing the game to speed the rate of heat loss from the meat. The de-boned meat is typically placed into a bag to hang in a cool, dry location and/or to transport the meat to another location for refrigeration or other preparation. However, although de-boning does prevent heat from the bone being steadily released into the meat, often times the bag filled with de-boned meat will retain more heat than the full quarter with the bone if no other steps are taken to speed the rate of cooling. In addition, the de-boned meat lacks the internal structural support provided by bones, which may generally cause the de-boned meat to be more difficult to handle as the meat generally does not retain its shape as well after the bone has been removed. Thus, de-boned meat tends to be more difficult to hang and to transport inside a bag.

SUMMARY

In one aspect, a device for hanging and transporting meat is provided. The device is designed to function generally as a structural component that can be used as a bone replacement for a piece of de-boned meat while also allowing the meat to cool as quickly as possible. The device comprises a hollow elongated tube having a plurality of openings disposed along a longitudinal length of the tube and an attachment secured to at least one end of the tube. The openings allow air flow between an interior and an exterior of the tube. The attachment comprises a pair of opposing hook members each extending outwardly relative to a longitudinal axis of the tube. Each of the opposing hook members has a pointed end that points upward when the device is in an upright position for normal use. The device may include a second attachment secured to an opposing end of the tube. The second attachment also comprises a pair of opposing hook members each also pointing upward. The attachments are preferably detachable from the tube for ease of transporting and storing the device when not in use.

Once a piece of meat such as a leg quarter has been de-boned and the bones discarded, the tube can be placed against the meat in a location generally where the bone was located prior to de-boning. An attachment with hook members can be attached to one or both ends of the tube, and the meat can then be wrapped around the tube so that the tube is completely surrounded by meat. The opposing hook members are inserted into portions of the meat to support the meat for hanging. A rope or cord can be secured to the attachment that is secured to the upper end of the tube for hanging the device from a structure such as a tree limb with the meat hanging on the hook members of the device. The device is preferably constructed of a generally lightweight metal, such as aluminum, that has sufficient strength for supporting a large piece of meat while also minimizing the weight of the device. The hollow tube generally weighs significantly less than the bones of large game animals but has the strength to provide internal structural support for the meat so that the meat better retains its overall shape to facilitate ease of handling the meat. The reduction in overall weight by replacing bones with the tube also minimizes the weight that a hunter must haul out of a hunting area after killing game. Because many hunting areas where large game are taken can be very remote and sometimes have rugged terrain, hauling game meat out of such areas can be difficult and is sometimes done manually. Thus, any additional weight that is eliminated is advantageous to a hunter. In addition, the hollow metal tube with openings along its length provides for efficient transfer of heat from the meat to the tube and then to the external environment to aid in preventing spoilage until the meat can be refrigerated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

In one aspect, a device 10 for hanging and transporting meat is provided. FIGS. 1-8 illustrate preferred embodiments of the device 10 or components thereof. The device 10 may be used for by hunters to hang game meat 70 that has been de-boned in the field for the purpose of cooling the meat 70 quickly to prevent spoilage and to haul the meat 70 out of remote hunting areas after taking game. The device 10 comprises one or more tubes 12 and one or more attachments 14 that are each configured to be secured to a tube 12.

Figures 3, 4:
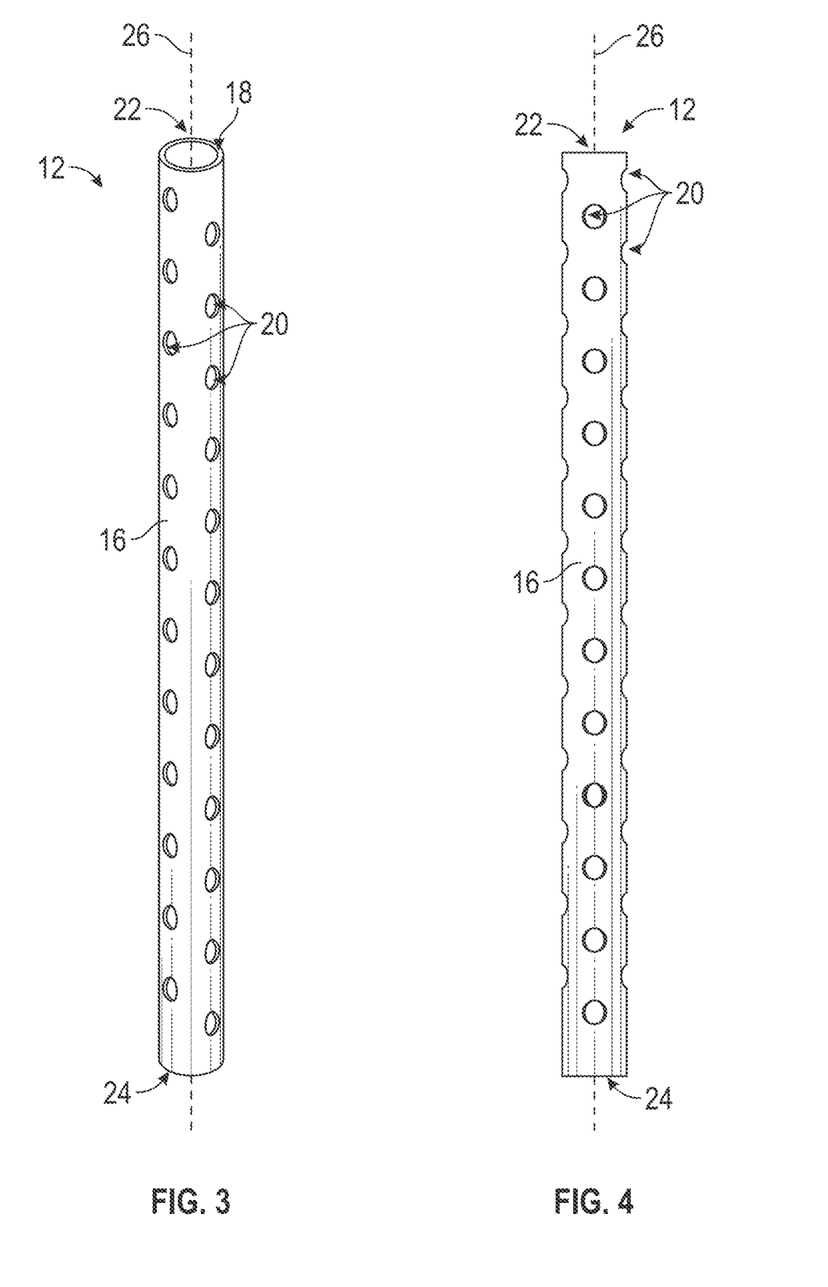
FIG. 3 shows a perspective view of a tube component for a device for hanging meat in accordance with the present disclosure.
FIG. 4 shows an elevational view of a tube component for a device for hanging meat in accordance with the present disclosure.

As best seen in FIGS. 3 and 4, each tube 12 has an elongated body 16 that defines a longitudinal axis 26 extending along a longitudinal length of the body 16. Each tube 12 has a first end 22 and a second end 24. Each attachment 14 is configured to be secured to the first end 22 or to the second end 24 of the tube 12. The body 16 of each tube 12 has a hollow interior defined by a wall 18 of the tube 12. The wall 18 of the tube 12 preferably has a plurality of openings 20 extending through the wall 18. The plurality of openings 20 are disposed along the longitudinal length of the tube 12 generally between the first end 22 and the second end 24. In a preferred embodiment, as shown in FIGS. 3 and 4, the plurality of openings 20 comprises multiple series of equidistantly spaced openings 20 in which each series of openings 20 is disposed longitudinally in a linear path down a side of the tube 12. In a preferred embodiment, each tube 12 has four series of linearly spaced openings 20 that are spaced apart around the circumference of the tube 12. Each series preferably has ten or more individual openings 20. Each opening 20 is preferably a circular opening 20.

The openings 20 allow air flow between an interior and an exterior of the tube 12. The hollow interior and openings 20 also minimize the weight of the tube 12. Each tube 12 is preferably open at both the first end 22 and at the second end 24, as best seen at the first end 22 shown in FIG. 3. The body 16 of each tube 12 preferably has a generally cylindrical shape and thus a circular cross-sectional shape along a plane perpendicular to the longitudinal axis 26. Alternatively, each tube 12 may have a square cross-sectional shape or other suitable shape. Each tube 12 is preferably constructed of a generally lightweight metal, such as aluminum. Each attachment 14 is preferably also constructed of aluminum or a similar lightweight metal. Such construction materials generally provide sufficient structural strength for both the tubes 12 and attachments 14 to support a large piece of meat 70 while also minimizing the overall weight of the device 10. To provide additional structural strength the tubes 12 and/or attachments 14 may be constructed of stainless steel or other materials of similar strength and rigidity.

Figure 1:
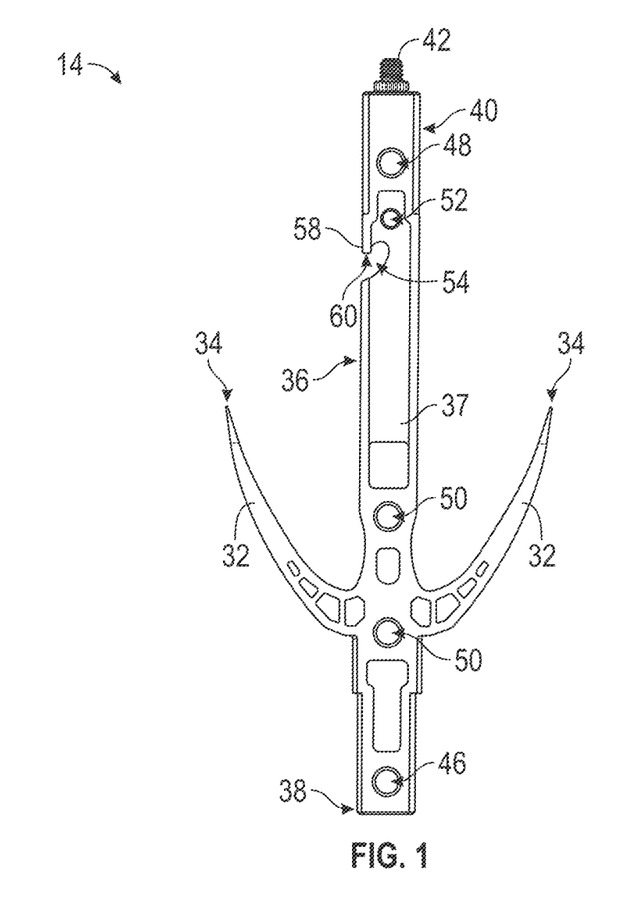
FIG. 1 shows an elevational view of a hook attachment for a device for hanging meat in accordance with the present disclosure.
Figure 2:
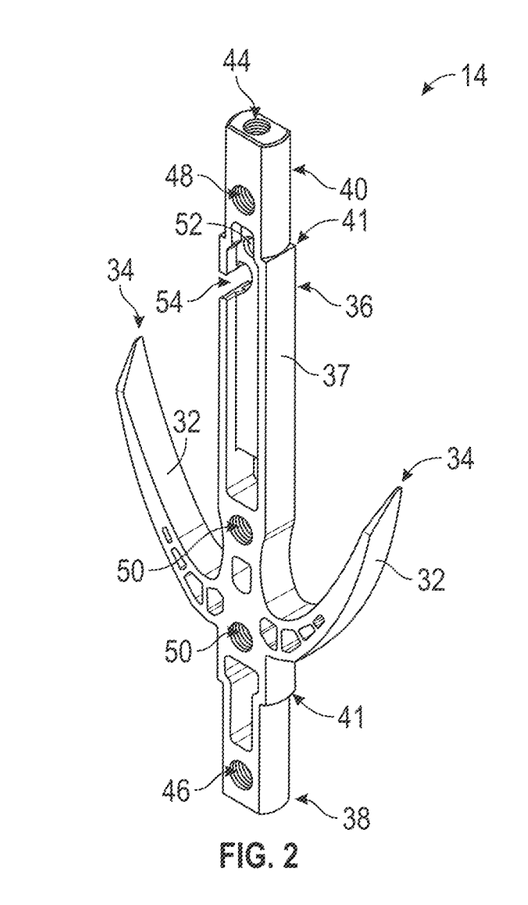
FIG. 2 shows a perspective view of a hook attachment for a device for hanging meat in accordance with the present disclosure.
Figure 5:
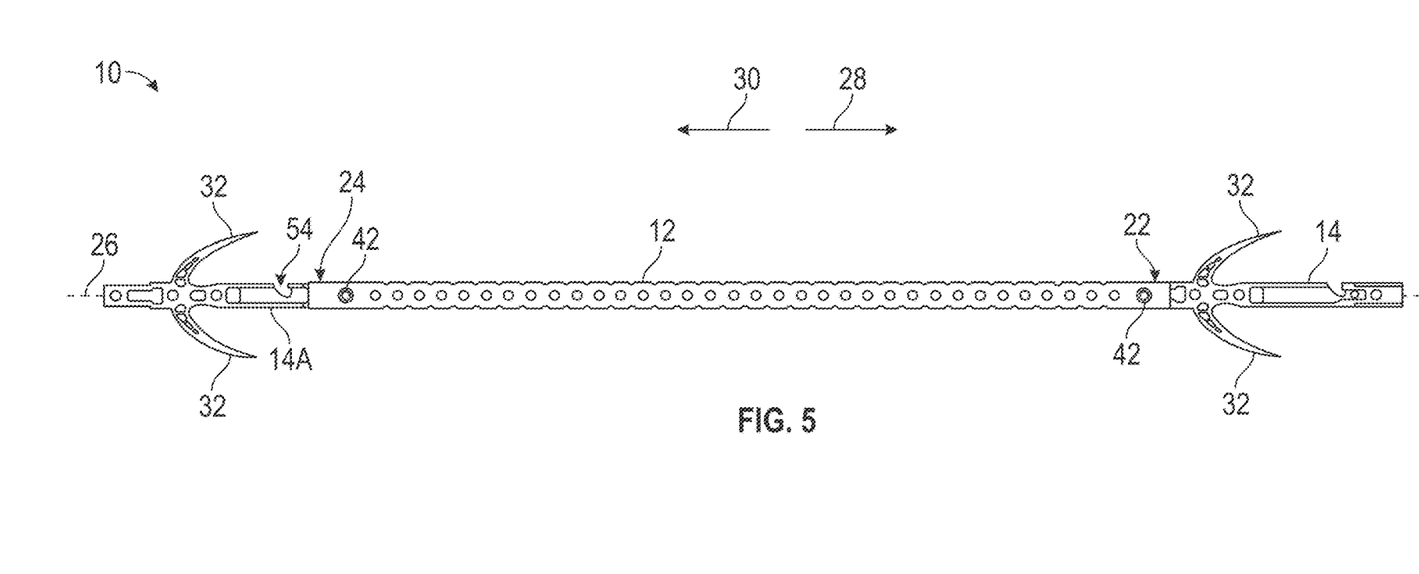
FIG. 5 shows an elevational view of a device for hanging meat in accordance with the present disclosure.
Figures 8, 9:
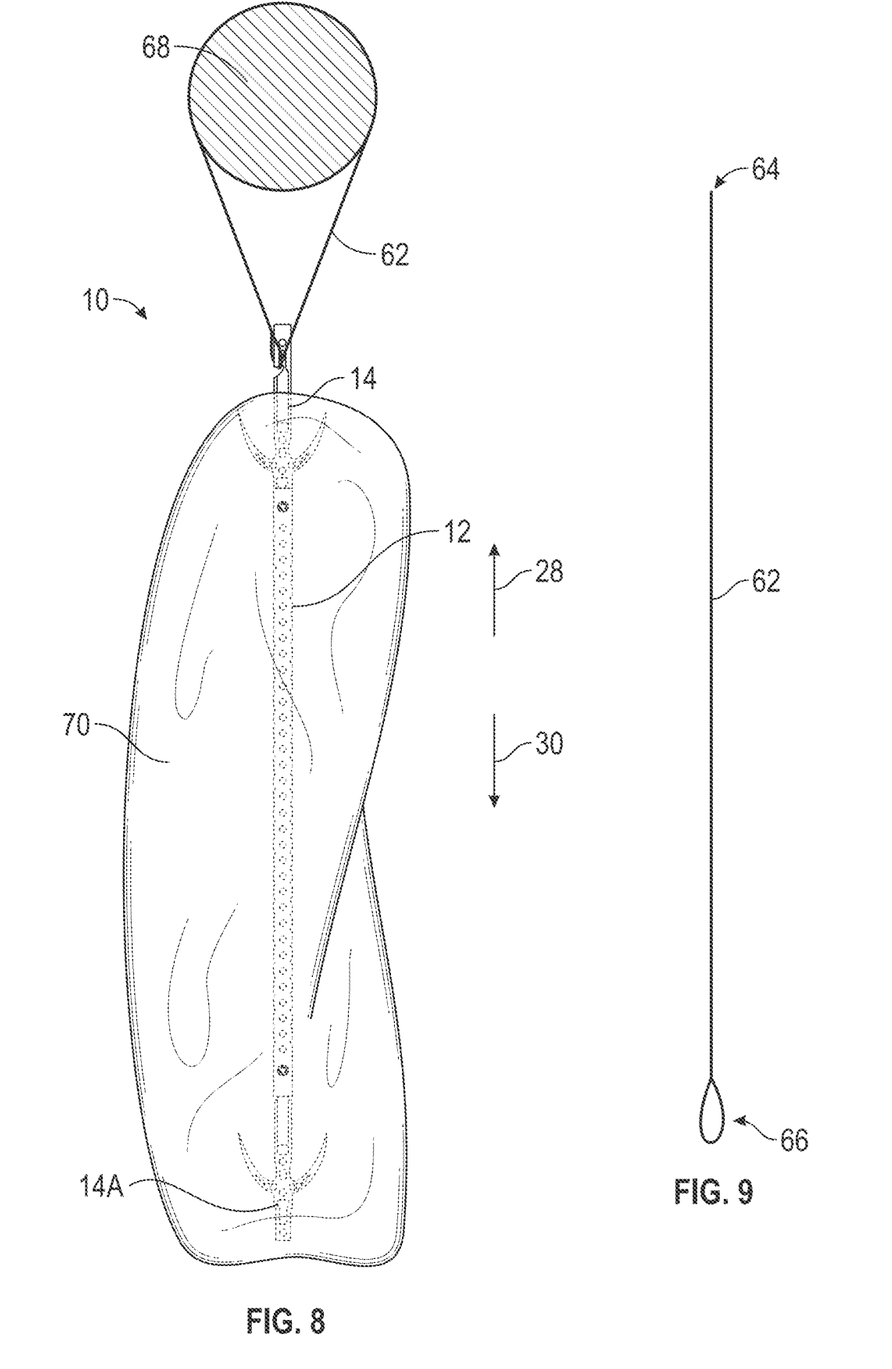
FIG. 8 shows a device for hanging meat in use hanging a piece of meat from a structure in accordance with the present disclosure.
FIG. 9 shows a component of a device for hanging meat in accordance with the present disclosure.

As best seen in FIGS. 1, 2, and 5, each attachment 14 comprises a pair of opposing hook members 32 each extending outwardly relative to the longitudinal axis 26 of the tube 12 when the attachment is secured to the first end 22 or to the second end 24 of the tube 12. Each of the opposing hook members 32 has a pointed end 34 that points in a longitudinal direction 28 that is directed from the second end 24 toward the first end 22, as indicated in FIG. 5. When the device 10 is in an upright position for normal use, the direction 28 in which the pointed ends 34 of the hook members 32 are pointed generally corresponds to an upward direction 28, as indicated in FIG. 8, which shows the device 10 being used to hang a piece of meat 70 from a tree branch 68, as opposed to a downward longitudinal direction 30 directed from the first end 22 toward the second end 24. Thus, each hook member 32 has a leading edge, which defines a terminal end 34 of the hook member 32, that points upward so that the hook member 32 can be used for hanging meat 70. The hook members 32 being oriented so that the pointed ends 34 point in an upward direction 28 allows the hook members 32 to be inserted into the meat 70 to support the meat 70 and allows the meat 70 to hang from the hook members 32 when the device 10 is oriented for normal use. Thus, each of the hook members 32 functions as a rigid hook that allows the device 10 to hook the meat 70 using the pointed ends 34 to retain the meat 70 on the device 10 against the weight of the meat 70. When pointing in an upward direction 28, the direction in which the pointed ends 34 are generally pointing may not be precisely parallel to longitudinal axis 26 but are angled sufficiently upward so that the hook members 32 can support and retain the weight of the meat 70.

As best seen in FIGS. 5 and 8, the device 10 may optionally include a second attachment 14A secured to the opposing second end 24 of the tube 12, which is the lower end 24 when the device 10 is in use. The second attachment 14A also comprises a pair of opposing hook members 32 each extending outwardly relative to the longitudinal axis 26 and each also having a pointed end 34 pointing in an upward direction 28 when the device 10 is in an upright position for normal use. Thus, when using both attachments 14 and 14A, the pointed ends 34 of both attachments 14 and 14A are all pointed in the same upward longitudinal direction 28. Both attachments 14 and 14A are preferably detachable from the tube 12 for ease of transporting and storing the device 10 when not in use. Thus, the first attachment 14 may be removably secured to the first end 22 of the tube 12, and the second attachment 14A may be removably secured to the second end 24 of the tube 12. In a preferred embodiment, each attachment 14 is configured to be secured to the first end 22 or to the second end 24 of the tube 12 at a terminal end of the tube 12 so that the attachment 14 extends axially beyond the terminal end of each end 22, 24 of the tube 12 when the attachment 14 is secured to the end 22, 24 of the tube 12.

In a preferred embodiment, as best seen in FIGS. 1 and 2, each attachment 14 comprises an elongated support member 36 that is axially aligned with the longitudinal axis 26 when the attachment is secured to one end 22, 24 of the tube 12. Each of the opposing hook members 32 is attached to the support member 36 and extends outwardly from the support member 36 relative to the longitudinal axis 26. Thus, each hook member 32 in combination with the support member 36 forms a rigid hook structure. The support member 36 of each attachment has a first end 38 and a second end 40. The first end 38 of the support member 36 is preferably configured to be removably secured to the first or upper end 22 of the tube 12, and the second end 40 of the support member 36 is preferably configured to be removably secured to the second or lower end 24 of the tube 12. Thus, the first end 38 corresponds to a lower end of the support member 36, and the second end 40 corresponds to an upper end of the support member 36 when the attachment 14 is secured to the tube 12 and the device 10 is in an upright position for normal use.

Figure 6:
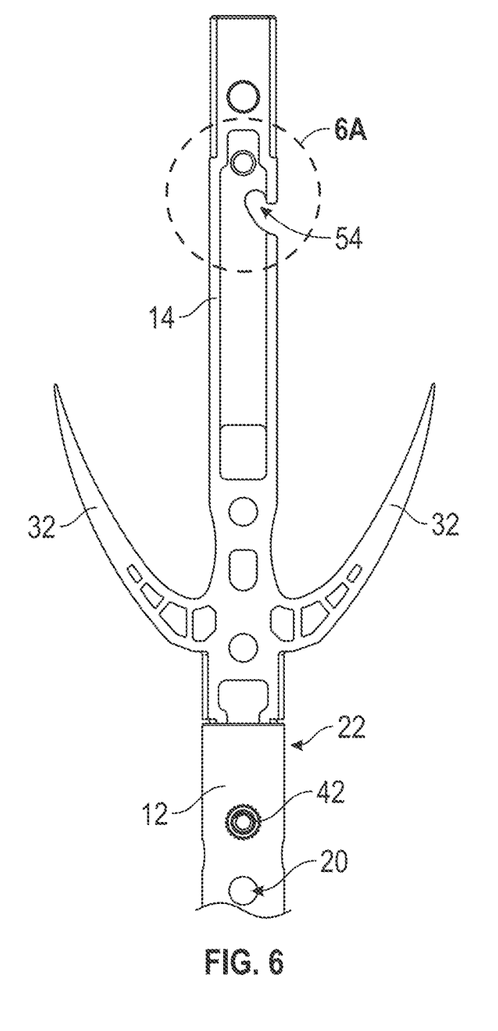
FIG. 6 shows a partial elevational view of a device for hanging meat in accordance with the present disclosure.

In a preferred embodiment, in order to allow each attachment 14 to be removably secured to one end 22, 24 of the tube 12, the elongated support member 36 of each attachment 14 may comprise a center portion 37 to which the first end 38 and second end 40 are attached. As best seen in FIGS. 1 and 2, the first end 38 may extend axially from a lower end of the center portion 37, and the second end 40 may extend axially from an upper end of the center portion 37. As best seen in FIGS. 5 and 6, the portions of the attachment 14 forming the first end 38 and second end 40 may be configured to be inserted into an open end 22 or 24 of the tube 12 to removably secure the attachment 14 to the tube 12. Because each tube 12 is preferably cylindrical with a circular open end 22, 24, at least a portion of the first end 38 and second end 40 of the attachment 14 preferably has a curved shaped configured to conform to an inner diameter of the open ends 22 and 24 of the tube 12 so that ends 38 and 40 fit tightly within open ends 22 or 24 with minimal excess space between an exterior surface of ends 38 and 40 and an interior surface of the tube wall 18.

Once ends 38 and/or 40 are inserted into a respective one of the open ends 22 or 24 of the tube 12, the attachment 14 may be removably secured to the tube 12 using a fastener. In a preferred embodiment, the first end 38 of the attachment 14 has an opening 46 extending transversely through the first end 38, and the second end 40 also has an opening 48 extending transversely through the second end 40, as best seen in FIG. 1. In this embodiment, the device 10 may further comprise one or more threaded bolts 42 configured to fasten the attachment 14 to the tube 12. For instance, as best seen in FIG. 6, the lower end 38 of the attachment 14 may be inserted into the upper end 22 of the tube 12, and a bolt 42 may then be inserted through one of the openings 20 in the wall 18 of the tube 12 and also through opening 46 of the attachment 14. As best seen in FIG. 2, openings 46 and 48 may be threaded so that the attachment 14 may be fastened to the tube 12 using the bolt 42. Similarly, a separate bolt 42 may be inserted through an opening 20 in the tube wall 18 and opening 48 to secure the upper end 40 of another attachment 14A to the lower end 24 of the tube 12. The bolt 42 may have a head that is attached to the bolt 42 in a fixed position to allow manual rotation of the bolt 42 using the head. To securely fasten the attachment 14 to the tube 12, the bolt 42 may be threaded into opening 46 or 48 until the head contacts an exterior surface of the wall 18 of the tube 12, as best seen in FIG. 6. In a preferred embodiment, as shown in FIG. 2, a top side of the upper end 40 of the attachment 14 may have an axially aligned threaded opening 44 into which the bolt 42 can be threaded for secure storage of the bolt 42 when the attachment 14 is not secured to the tube 12, as shown in FIG. 1. In alternative embodiments, other mechanisms for fastening the attachment 14 to the tube 12 may be utilized, including, but not limited to, pins, clips, clamps, or other types of threaded or non-threaded fasteners. In one alternative embodiment, the interior of each open end 22 and 24 of the tube 12 can have female threads and the ends 38 and 40 of each attachment 14 can have compatible male threads so that the attachment 14 can be directly threaded onto the tube 12.

As best seen in FIG. 2, at least some portions of the center portion 37 of the elongated support member 36 may have a larger width or diameter than at least some portions of both the lower end 38 and the upper end 40 so that an edge 41 is formed at each of the locations where the lower end 38 and the upper end 40, respectively, are attached to the center portion 37 of the support member 36. As best seen in FIG. 6, when the lower end 38 of the attachment 14 is fully inserted into the upper end 22 of the tube 12, the top side of the tube wall 18 may abut against the edge 41, which allows the user to quickly position the attachment 14 in the correct position with opening 46 being aligned with an opening 20 in the tube wall 18 so that the bolt 42 can be inserted and rotated to fasten the attachment 14 to the tube 12. The edge 41 at the upper end 40 of the attachment 14 functions in the same manner to allow the upper end 40 to be correctly positioned axially within the lower end 24 of the tube 12 to align opening 48 with an opening 20 in the tube wall 18.

In a preferred embodiment, the opposing hook members 32 are attached to opposing sides of the center portion 37 of each attachment 14, as shown in FIG. 1. Each hook member 32 extends laterally outward from the center portion 37 of the support member 36 and thus outward from the longitudinal axis 26 that is defined by the tube 12 and support member 36 when the attachment 14 is secured to the tube 12. As each hook member 32 extends laterally outward, the hook member 32 then extends in an upward direction 28, which is generally a direction moving from the second or lower end 24 of the tube 12 toward the first or upper end 22 of the tube 12, or from the first or lower end 38 of the attachment 14 toward the second or upper end 40 of the attachment 14. As best seen in FIGS. 1 and 2, each hook member 32 is preferably curved in the upward direction 28 until the hook member 32 terminates at a pointed end 34, which is generally pointing in the upward direction 28 when the device 10 is oriented in an upright position for use. Alternatively, each hook member 32 may be angled rather than curved with the hook member 32 comprising one or more straight sections disposed at angles to axis 26 and/or to each other and terminating at a pointed end 34 that is generally pointing in the upward direction 28. The upwardly pointing ends 34 allows the meat 70 to rest on and be supported by the hook members 32 when the device 10 is hanging as shown in FIG. 8. Each pointed end 34 may be tapered to a relatively sharp point to allow the hook members 32 to more easily be inserted into the meat 70 to support the meat on the hook members 32. When using an optional second attachment 14A in addition to attachment 14, the second attachment 14A at the lower end of the device 10 provides additional support to large pieces of meat 70 to reduce the amount of weight being supported by attachment 14. In an alternative embodiment, each attachment 14 may have only a single hook member 32 that extends outwardly from one side of the support member 36. In other alternative embodiments, each attachment 14 may have more than two hook members 32 that extend outwardly from the support member 36. For instance, each attachment 14 may comprise three hook members 32, which may be arranged at 120-degree angles from each other about the longitudinal axis 26.

Figures 7, 7A:
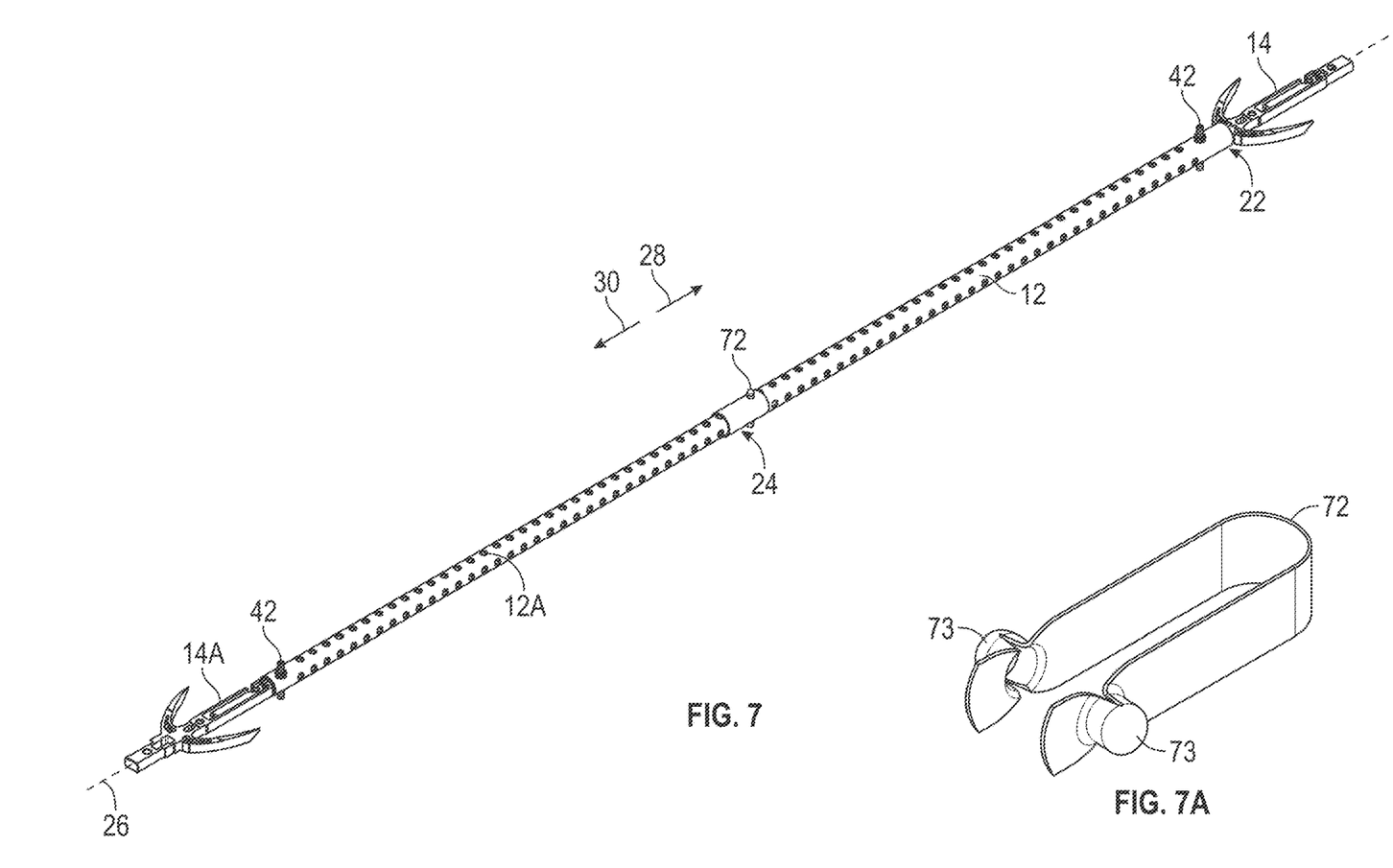
FIG. 7 shows a perspective view of a device for hanging meat in accordance with the present disclosure.
FIG. 7A shows a perspective view of a component of a device for hanging meat in accordance with the present disclosure.

In one embodiment, as shown in FIG. 7, the device 10 may optionally further comprise a second tube 12A having an outer diameter that is smaller than an inner diameter of the first tube 12 so that the second tube 12A fits within the hollow interior of the first tube 12. The second tube 12A also has an elongated body 16 having a first or upper end 22 and a second or lower end 24. The body 16 of the second tube 12A has a hollow interior defined by a wall 18 of the second tube 12A. The wall 18 of the second tube 12A preferably also has a plurality of openings 20 extending through the wall 18 with the plurality of openings 20 disposed along a longitudinal length of the second tube 12A. The tubes 12 and 12A in combination define a longitudinal axis 26 when the tubes are axially aligned with each other. The first tube 12 and the second tube 12A are configured to be secured to each other in an axially fixed position relative to each other. When secured to each other, the second tube 12A is preferably partially disposed within the hollow interior of the first tube 12, as shown in FIG. 7. The second tube 12A may be placed mostly or entirely within the hollow interior of the first tube 12 for storage when the device 10 is not being used.

To secure the first tube 12 and the second tube 12A to each other, the device 10 may further comprise a spring clip 72 configured to fix the axial position of the first tube 12 and the second tube 12A relative to each other. FIG. 7A illustrates the spring clip 72 used to secure to the tubes as shown in FIG. 7. The clip 72 has two opposing protrusions 73 that are each sized to fit within openings 20 in the walls 18 of both tubes 12 and 12A. The clip 72 may be placed within the interior of tube 12A. The clip 72 may have a C-shaped portion designed to bias the protrusions 73 in an outward direction relative to the longitudinal axis 26. The protrusions 73 can be pressed inward to allow tube 12A to slide within the interior of tube 12 and be positioned in a desired position relative to tube 12. When tube 12A is in the desired position, openings 20 in each tube 12 and 12A can be aligned so that the protrusions 73 move outward into openings 20 in both the inner tube 12A and the outer tube 12 to retain tubes 12 and 12A in a fixed position relative to each other. Thus, tube 12A can be used as an extension to extend the length of tube 12 to a desired length, which may be useful when using the device 10 to hang or transport larger pieces of meat 70. In alternative embodiments, other mechanisms for securing the tubes 12 and 12A to each other may be utilized, including, but not limited to, pins, threaded fasteners, clamps, or other types of clips.

Because tube 12A has a smaller diameter than tube 12, the upper end 40 of attachment 14A may also have a smaller diameter than the lower end 38 of attachment 14 so that the upper end 40 of attachment 14A is compatible with the open end of tube 12A. In one embodiment, the device 10 may comprise a kit having multiple tubes and multiple attachments both of varying sizes so that different attachments are compatible with different tubes of the kit. In this way, either larger tubes 12 or smaller tubes 12A can be used separately for hanging and transporting meat 70 or used in combination as shown in FIG. 7.

Figure 6A:
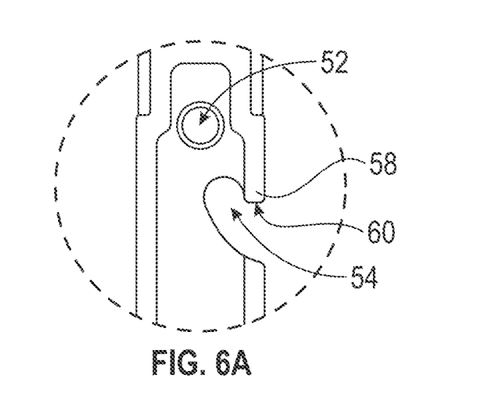
FIG. 6A shows a detailed view of a portion of a device for hanging meat in accordance with the present disclosure.

In a preferred embodiment, the device 10 further comprises a cord 62 for using the device 10 to hang a piece of meat 70 as shown in FIG. 8. The cord 62 is preferably a parachute cord comprising nylon kernmantle rope, but the cord 62 may also be a length of another type of rope or cord, string, cable, or any other type of elongated flexible material of sufficient strength to support a large piece of meat 70. The cord 62 has a first end 64 and an opposing second end 66, as shown in FIG. 9. The second end 66 preferably has a closed loop configured for securing the second end 66 to the attachment 14. Each attachment 14 may be configured to secure each of the opposing ends 64 and 66 of the cord 62 to the attachment 14. To attach the cord 62, the support member 36 of the attachment 14 preferably has a ring support 52 configured to secure the first end 64 of the cord 62 to the support member 36. The ring support 52 may be formed by an opening extending through the support member 36 or other portion of the attachment 14. The first end 64 of the cord 62 may be inserted through the opening 52 and then tied to the support member 36. In a preferred embodiment, as best seen in FIG. 6A, the support member 36 also has a notch 54 formed in the support member 36 for securing the looped end 66 of the cord 62 to the attachment 14. The notch 54 has an open side and is partially defined by a securing member 58 having a leading edge 60 that points in a longitudinal direction 30 that is opposite the longitudinal direction 28 in which each of the opposing hook members 32 is pointed. Thus, when the device 10 is in an upright position for normal use, the leading edge 60 of the securing member 58 points in a downward direction 30.

The present device 10 may be utilized as a structural component that can be used as a bone replacement for a piece of de-boned meat 70 while hanging the meat 70, which allows the meat to cool as quickly as possible. The device 10 may also be used to transport the de-boned meat 70 by enclosing the meat 70 and the device 10 supporting the meat 70 within a bag (not shown) and transporting the meat by any suitable means. The tube 12 of the device provides structural support for the de-boned meat 70 so that the meat 70 better retains its overall shape and is thus easier to handle. The hollow tube 12 generally weighs significantly less than the bones of large game animals but has the strength to support the weight of the meat 70 and provide internal structural support for the meat 70. The reduction in overall weight also minimizes the weight that a hunter must haul out of a hunting area after killing game. In addition, the hollow metal tube 12 with openings 20 along its length provides for efficient transfer of heat from the meat 70 to the external environment to aid in preventing spoilage until the meat 70 can be refrigerated.

Although the device 10 may optionally be used to hang a piece of meat with all bones left in place, it is preferably used with de-boned meat 70. To use the device 10 to hang or transport a piece of meat, as shown in FIG. 8, the meat 70 is first de-boned and the bones discarded. The meat may be cut down to the bone, and then cuts may be made around the bone to remove the bone from the meat. The tube 12 can then be placed against the meat 70 in a location generally where the bone or bones were located prior to de-boning. The attachment 14 with hook members 32 is then attached to at least the upper end 22 of the tube 12. A second attachment 14A is optionally attached to the lower end 24 of the tube 12. Both attachments 14 and 14A are attached to the tube 12 so that the pointed ends 34 of all of the hook members 32 are pointed in an upward direction 28. The de-boned meat 70 can then be wrapped around the tube 12 so that the tube 12 is completely surrounded by meat 70. The opposing hook members 32 of the attachments 14, 14A are inserted into portions of the meat 70 to support the meat 70 for hanging or transport. Separate clips, hooks, or similar devices (not shown) may optionally be used to secure one end of the meat to an opposing end of the meat where the meat was cut to de-bone the meat to help retain the meat on the device 10.

To hang the meat 70 using the device 10, the first end 64 of the cord 62 can be secured to the attachment 14 that is secured to the upper end 22 of the tube 12 by inserting the first end 64 through opening 52 and tying the first end 64 to the attachment 14. The second end 66 can then be looped over a structure such as a tree limb 68. A portion of the loop at the second end 66 can then be inserted into the open side of notch 54 of the attachment 14, as shown in FIG. 8. The downwardly extending leading edge 60 of the securing member 58 retains the loop 66 within the notch 54 once the weight of the meat 70 produces tension on the cord 62. The meat 70 can then hang on the hook members 32 of the device 10. With the hollow metal tube 12 replacing the bone within the meat 70, heat can be more efficiently transferred from the interior of the meat 70 to the metal tube 12 and then to the external environment through the metal attachments 14, 14A at the ends 22, 24 of the tube 12. A bag may be place around the meat 70 while hanging to protect the meat and minimize contamination from the outside environment.

Figure 10:
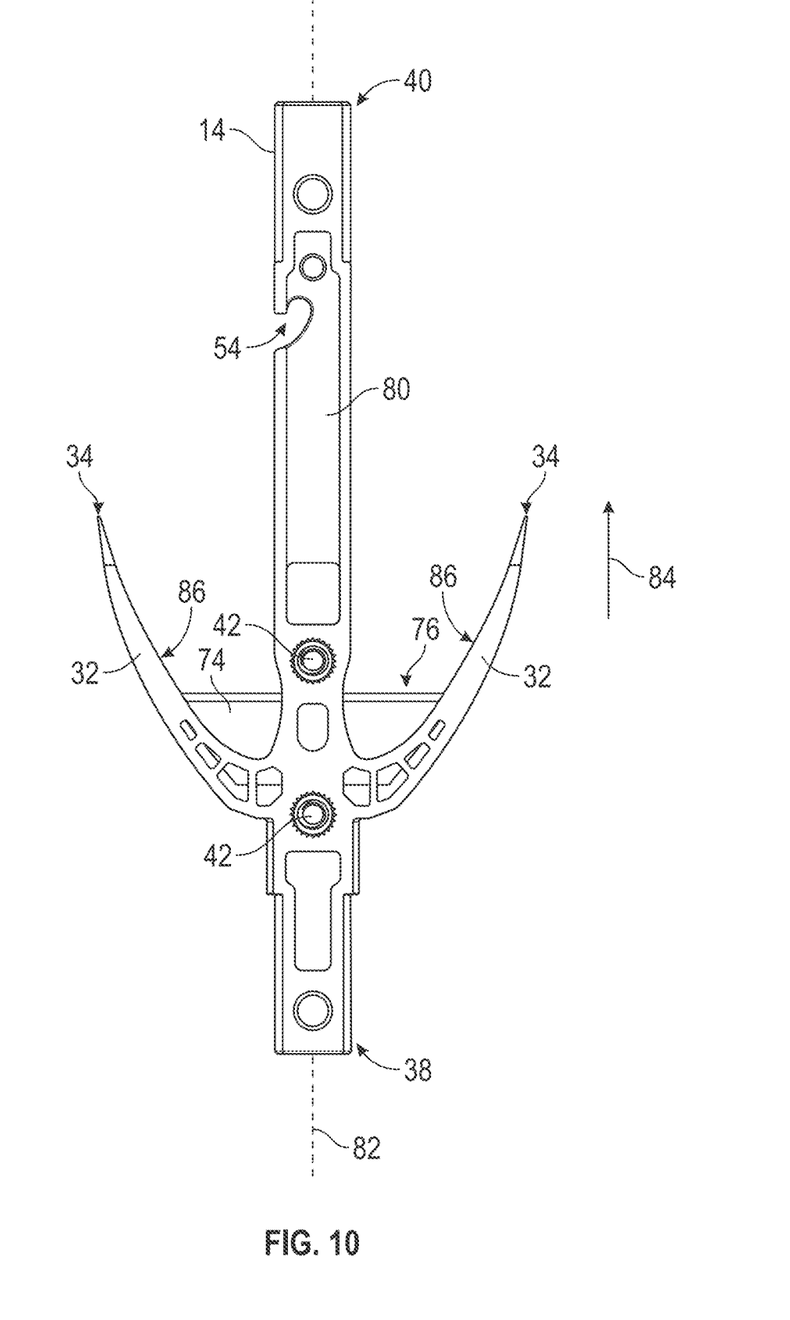
FIG. 10 shows a front elevational view of a device for cutting meat in accordance with the present disclosure.
Figure 11:
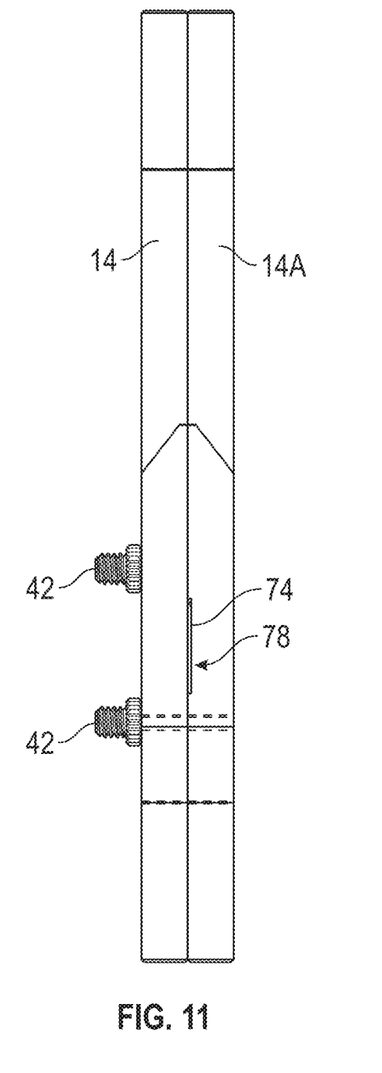
FIG. 11 shows a side elevational view of a device for cutting meat in accordance with the present disclosure.
Figure 12:
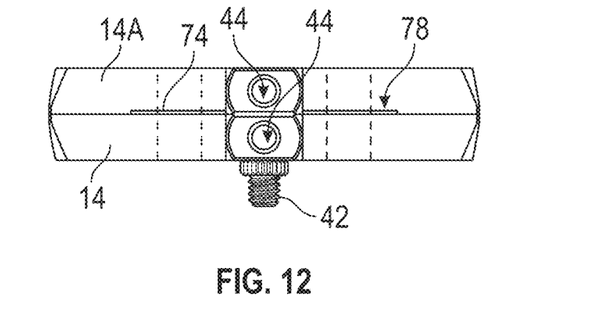
FIG. 12 shows a top plan view of a device for cutting meat in accordance with the present disclosure.
Figure 13:
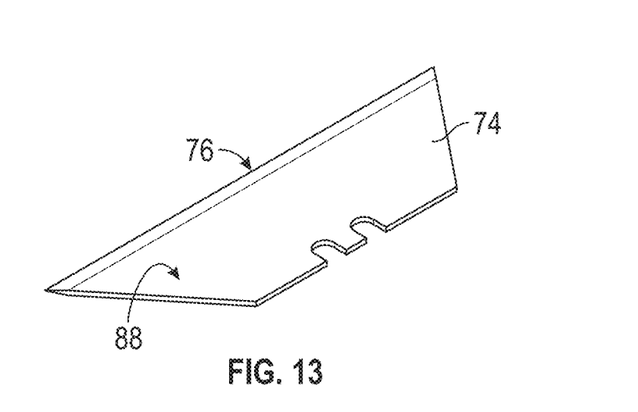
FIG. 13 shows a perspective view of a blade for use with a device for cutting meat in accordance with the present disclosure.

FIGS. 10-13 illustrate components of the device 10 arranged in an alternative embodiment. In this embodiment, the device 10 includes two attachments 14, 14A and a blade 74 having a sharpened edge 76 for cutting, as shown in FIG. 13. The first attachment 14 and second attachment 14A are the same as described with respect to other embodiments and both generally have the same shape and size. The first attachment 14 and second attachment 14A are also configured to be removably secured to each other. Each of FIGS. 10-12 show both attachments 14 and 14A fastened together using two threaded bolts 42. FIG. 10 shows a front view so that only one attachment 14 is visible. FIGS. 11 and 12 show a side view and a top view, respectively, with both attachments 14 and 14A being visible. In a preferred embodiment, as shown in FIG. 1, each attachment 14, 14A has two threaded openings 50 configured to fasten the attachments 14, 14A to each other with bolts 42. Openings 50 are preferably positioned so that the bolts 42 are in close proximity to the blade 74, as best seen in FIG. 10. One bolt 42 is preferably positioned directly above the blade 74, and a second bolt 42 is preferably positioned directly below the blade 74. In one embodiment, the openings 50 in one of the two attachments may be threaded, as best seen in FIG. 2, and the openings 50 in the other attachment may not be threaded so that each bolt 42 needs to be threaded into only one opening 50 to fasten the attachments to each other.

Each of the first and second attachments 14, 14A comprises an elongated handle portion 80 that defines a longitudinal axis 82. The handle portion 80 has a first end 38 and an opposing second end 40. In this embodiment, the handle portion 80 may generally be defined by the upper end 40 of the support member 36 and the portion of the center portion 37 disposed on the upper side of the blade 74. The handle portion 80 may be held by a user's hand to use the device in this embodiment for cutting meat or other portions of an animal, such as the skin or hide when field dressing the animal. When attachments 14 and 14A are fastened to each other, the handle portion 80 that the user holds is formed by the handle portions 80 of both attachments 14 and 14A. Each of the first and second attachments 14, 14A further comprises a pair of opposing hook members 32 each extending outwardly relative to the longitudinal axis 82. Each of the opposing hook members 32 is attached to the first end 38 of the handle portion 80, and each hook member 32 extends outwardly from the handle portion 80 and also extends toward the second or upper end 40. Each of the opposing hook members 32 has a pointed end 34 that points in a longitudinal direction 84 that is directed from the first or lower end 38 toward the second or upper end 40.

The blade 74 is disposed between the first and second attachments 14 and 14A, and the sharpened edge 76 extends transversely between an inner side 86 of each of the pair of opposing hook members 32 of each of the first and second attachments 14, 14A, as best seen in FIG. 10. In a preferred embodiment, as best seen in FIGS. 11 and 12, at least one of the attachments 14A has an indentation 78 sized and configured to receive at least portions of a lateral side 88 of the blade 74 within the indentation 78. Thus, when attachments 14 and 14A are fastened together, the blade 74 is retained within the indentation 78 and between the attachments 14 and 14A. Once the blade 74 is secured in place, the user can hold the handle portion 80 and insert the pointed ends 34 of the hook members 32 on either side of the handle portion 80 into an area for cutting. The user can then pull the device back toward the user to cut meat or other portions of the animal using the blade 74. For instance, the pointed ends 34 can be inserted between the skin and flesh of an animal, and the user can pull the device to cut the skin away from the flesh, thereby using the blade 74 for skinning the animal.

In addition to openings 46, 48, 50, and 52, the hook members 32 and other portions of each attachment 14 may have additional openings extending through the attachment 14 to minimize the weight of each attachment 14, as best seen in FIGS. 1 and 2.

It will be appreciated that the configurations and methods shown and described herein are illustrative only, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein. It is understood that versions of the invention may come in different forms and embodiments. Additionally, it is understood that one of skill in the art would appreciate these various forms and embodiments as falling within the scope of the invention as disclosed herein.

What is claimed is:

1. A device comprising:
a tube having an elongated body that defines a longitudinal axis, wherein the tube has a first end and a second end, wherein the body has a hollow interior defined by a wall of the tube, wherein the wall of the tube has a plurality of openings extending through the wall, wherein the plurality of openings are disposed along a longitudinal length of the tube; and
an attachment secured to the first end of the tube, wherein the attachment comprises a pair of opposing hook members each extending outwardly relative to the longitudinal axis, wherein each of the opposing hook members has a pointed end that points in a longitudinal direction that is directed from the second end of the tube toward the first end of the tube.

2. The device of claim 1, wherein the body of the tube has a cylindrical shape.

3. The device of claim 1, wherein the tube is open at the first end and open at the second end.

4. The device of claim 1, wherein the attachment is removably secured to the first end of the tube.

5. The device of claim 1, further comprising a cord having two opposing ends, wherein the attachment is configured to secure each of the opposing ends of the cord to the attachment.

6. The device of claim 1, wherein the attachment comprises an elongated support member that is axially aligned with the longitudinal axis, wherein each of the opposing hook members is attached to the support member.

7. The device of claim 6, wherein the support member has a first end and a second end, wherein the first end of the support member is configured to be removably secured to the first end of the tube and the second end of the support member is configured to be removably secured to the second end of the tube.

8. The device of claim 6, wherein the support member has a ring support configured to secure a cord to the support member.

9. The device of claim 6, wherein the support member has a notch formed in the support member, wherein the notch has an open side, wherein the notch is partially defined by a securing member having a leading edge that points in a longitudinal direction that is opposite the longitudinal direction in which each of the opposing hook members is pointed.

10. The device of claim 1, further comprising a second attachment secured to the second end of the tube, wherein the second attachment also comprises a pair of opposing hook members each extending outwardly relative to the longitudinal axis, wherein each of the opposing hook members of the second attachment has a pointed end that also points in a longitudinal direction that is directed from the second end of the tube toward the first end of the tube.

11. The device of claim 10, wherein the second attachment comprises an elongated support member that is axially aligned with the longitudinal axis, wherein each of the opposing hook members of the second attachment is attached to the support member of the second attachment.

12. The device of claim 11, wherein the support member of the second attachment has a first end and a second end, wherein the first end of the support member of the second attachment is configured to be removably secured to the first end of the tube and the second end of the support member is configured to be removably secured to the second end of the tube.

13. The device of claim 1, further comprising a second tube having an outer diameter that is smaller than an inner diameter of the first tube, wherein the second tube has an elongated body having a first end and a second end, wherein the body of the second tube has a hollow interior defined by a wall of the second tube, wherein the wall of the second tube has a plurality of openings extending through the wall of the second tube, wherein the plurality of openings of the second tube are disposed along a longitudinal length of the second tube, wherein the first tube and the second tube are configured to be secured to each other in an axially fixed position in which the second tube is partially disposed within the hollow interior of the first tube.

14. A method for hanging meat, said method comprising the steps of:
providing a device comprising:
a tube having an elongated body that defines a longitudinal axis, wherein the tube has a first end and a second end, wherein the body has a hollow interior defined by a wall of the tube, wherein the wall of the tube has a plurality of openings extending through the wall, wherein the plurality of openings are disposed along a longitudinal length of the tube, and
an attachment secured to the first end of the tube, wherein the attachment comprises a pair of opposing hook members each extending outwardly relative to the longitudinal axis, wherein each of the opposing hook members has a pointed end that points in a longitudinal direction that is directed from the second end of the tube toward the first end of the tube;
de-boning a piece of meat;
placing the tube against the piece of meat;
inserting each of the opposing hook members into the piece of meat;
securing a cord to the attachment; and
using the cord to hang the device and the piece of meat from a structure.

15. The method of claim 14, wherein the device further comprises a second attachment secured to the second end of the tube, wherein the second attachment also comprises a pair of opposing hook members each extending outwardly relative to the longitudinal axis, wherein each of the opposing hook members of the second attachment has a pointed end that also points in a longitudinal direction that is directed from the second end of the tube toward the first end of the tube, wherein the method further comprises the step of inserting each of the opposing hook members of the second attachment into the piece of meat.

16. The method of claim 14, wherein the device further comprises a second tube having an outer diameter that is smaller than an inner diameter of the first tube, wherein the second tube has an elongated body having a first end and a second end, wherein the body of the second tube has a hollow interior defined by a wall of the second tube, wherein the wall of the second tube has a plurality of openings extending through the wall of the second tube, wherein the plurality of openings of the second tube are disposed along a longitudinal length of the second tube, wherein the first tube and the second tube are configured to be secured to each other in an axially fixed position in which the second tube is partially disposed within the hollow interior of the first tube, wherein the step of placing the tube against the piece of meat comprises securing the first tube and the second tube to each other in an axially fixed position and placing both the first tube and the second tube against the piece of meat.

17. A device comprising:
a first attachment and a second attachment, wherein the first attachment and second attachment both generally have a same shape and size, wherein the first and second attachments are configured to be removably secured to each other, wherein each of the first and second attachments comprises an elongated handle portion that defines a longitudinal axis and has a first end and an opposing second end, wherein each of the first and second attachments further comprises a pair of opposing hook members each extending outwardly relative to the longitudinal axis, wherein each of the opposing hook members is attached to the first end of the handle portion, wherein each of the opposing hook members extends outwardly from the handle portion and extends toward the second end, wherein each of the opposing hook members has a pointed end that points in a longitudinal direction that is directed from the first end toward the second end; and a blade disposed between the first and second attachments, wherein the blade has a sharpened edge that extends transversely between an inner side of each of the pair of opposing hook members of each of the first and second attachments.

18. The device of claim 17, wherein at least one of the first and second attachments has an indentation sized and configured to receive at least portions of a lateral side of the blade within the indentation.

19. The device of claim 17, wherein the first and second attachments are configured to be fastened to each other using a threaded fastener.

* * * * *